United States Patent [19]

Chiu et al.

[11] 4,207,355
[45] Jun. 10, 1980

[54] COLD-WATER DISPERSIBLE, GELLING STARCHES

[75] Inventors: Chung-Wai Chiu, Princeton; Morton W. Rutenberg, North Plainfield, both of N.J.

[73] Assignee: National Starch and Chemical Corporation, Bridgewater, N.J.

[21] Appl. No.: 1,720

[22] Filed: Jan. 8, 1979

[51] Int. Cl.$^2$ .............................................. A23L 1/195
[52] U.S. Cl. .................................. 426/578; 426/579; 536/106
[58] Field of Search ............... 426/578, 579, 661, 573; 536/102, 104, 106, 107, 108, 109, 110

[56] References Cited

U.S. PATENT DOCUMENTS

| | | | |
|---|---|---|---|
| 2,721,802 | 10/1955 | Scalise | 426/578 |
| 2,935,510 | 5/1960 | Wurzburg | 426/578 |
| 3,021,222 | 2/1962 | Kerr et al. | 426/578 |
| 3,351,489 | 11/1967 | Battista | 127/32 |
| 3,539,358 | 11/1970 | Hing | 426/579 |
| 3,878,196 | 4/1975 | Glasscock | 536/104 |
| 3,899,602 | 8/1975 | Rutenburg et al. | 426/578 |
| 3,904,604 | 9/1975 | Tessler et al. | 536/102 |
| 3,970,767 | 7/1976 | Tessler et al. | 426/579 |

*Primary Examiner*—Jeanette M. Hunter
*Attorney, Agent, or Firm*—Edwin Szala; Janet E. Hasak

[57] ABSTRACT

A cold-water dispersible, modified starch characterized by forming a gel having a Bloom strength of at least 45 grams is prepared by converting a tapioca starch to a water fluidity of about 10 to 63, preferably 20 to 40; reacting the starch with a crosslinking agent to within defined Brabender viscosity limits sufficient to provide the modified starch with gelling properties; and drum-drying the converted, crosslinked starch to obtain the modified starch product. The gelling instant starch thus prepared is particularly useful in food systems of the type which gel upon standing, such as pie fillings, jellies, and puddings.

5 Claims, No Drawings

COLD-WATER DISPERSIBLE, GELLING STARCHES

BACKGROUND OF THE INVENTION

I. Field of the Invention

The present invention relates to a cold-water dispersible, modified starch characterized by its gelling properties, and a process for its preparation. This invention also relates to a pie filling or jelly formulation containing such a starch.

II. Description of the Prior Art

It is often desirable to prepare food systems which have a set or gel texture, such as pie fillings, puddings and jellies. Many types of food systems of this description contain gelling agents and must be cooked to effect gelation. Common gelling agents used in the past for this purpose are agar, gelatin, corn starch, pectin, carrageenin, algin, and combinations of locust-bean gum and xanthan gum. In addition, starches derived from, e.g., corn, potato, tapioca, and wheat which are acid-converted to a certain water fluidity level will retrograde to a gel when cooked.

An example of a food product which requires cooking to effect gelation is the conventional starch-based pudding, which generally consists of an ungelatinized starch, flavorings, sweetening agents, etc. Such puddings are prepared for consumption by adding milk, cooking until the starch is gelatinized, pouring the cooked mixture into a bowl or individual serving dishes, and cooling and/or refrigerating.

There are, however, certain disadvantages associated with food systems of this type. In addition to the fact that cooking of the food system is necessary to impart the gel texture thereto, many of the gelling agents used in these systems require specific conditions. Thus, for example, gelatin can be used only after dissolution in very hot water, and typical pectins for use in jellies require about 65% sugar solids to produce a gel.

The remaining types of known food systems which have a set or gel texture form a gel without cooking. Most of these products are milkbased and consist of pregelatinized (i.e., cold-water dispersible) starch, one or more settings agents, which are usually phosphate salts (e.g., tetrasodium pyrophosphate), and flavoring, sweetening, and coloring agents. The set or gel properties of these food systems are obtained from the interaction of the phosphate salts with the casein and calcium ion provided by the milk, and not with the starch ingredient in the formulation. The pregelatinized starch functions as a viscosity builder or thickening agent, but is not the prime factor in the development of the gel structure of the prepared food system.

The major drawback of these uncooked, so-called "instant", food formulations is that they do not have the firm gel structure of the cooked formulations, i.e., they do not cut as cleanly with a spoon; and their texture, rather than being smooth, is generally described as "grainy" in both appearance and "mouth-feel" characteristics. Moreover, the setting salts are not operative at low pH or in non-milk-based food systems.

U.S. Pat. No. 3,583,874 discloses a starch composition suitable as gelling agent in instant puddings, which comprises a blend of a pregelatinized, defatted starch and a granular, preswollen starch having a water fluidity in a certain range.

Accordingly, it is an object of the present invention to provide a cold-water dispersible, modified starch as one component which forms a gel when dispersed in cold water (i.e., without cooking), and further forms a gel at a low pH, as well as at a high pH, without the need for setting salts.

It is another object to provide an instant starch which is effective as a gelling agent in a non-milk-based food system.

It is a further object to provide a process for preparing a cold-water dispersible, modified starch which is capable of forming a gel using low sugar solids, and under certain conditions, without the presence of any sugar.

It is a still further object to provide a food system, e.g., a pie filling or jelly formulation, containing a cold-water dispersible gelling starch.

SUMMARY OF THE INVENTION

The above and related objects are achieved by a cold-water dispersible, modified tapioca starch with gelling properties, prepared by drum-drying a tapioca starch has been converted to a water fluidity of about 10 to about 63 and thereafter reacted with at least 0.005% by weight of a crosslinking agent, said converted, crosslinked starch being defined as having a Brabender Viscosity Differential, measured between 80° and 95° C., of from about −20 to +30%, measured at 7% solids using a 700 cm.-g. cartridge, or of from about −35 to −4%, measured at 10% solids using a 350 cm.-g. cartridge, and as having a Brabender viscosity at 80° C. of at least about 100 B.U., measured at 7% solids using a 700 cm.-g. cartridge, or of at least about 400 B.U., measured at 10% solids using a 350 cm.-g. cartridge, said converted, crosslinked starch after drum-drying being capable of forming a gel having a Bloom strength of at least 45 grams.

The present modified starch is useful in any food formulations where a starch which will gel without further cooking is desired, and is particularly suited for use in pie and cream fillings, puddings, spreads, jellies, and instant mixes of the type which are reconstituted with water or milk and allowed to set at room temperature. A food system containing such a starch will have properties, e.g., texture, appearance, gel structure, and flavor, which closely resemble those of a food formulation which is cooked.

DESCRIPTION OF THE PREFERRED EMBODIMENTS

The starch base applicable herein is native tapioca starch in its intact granular form which has been converted to a water fluidity of from about 10 to about 63. As used herein, the term "water fluidity" has a very specific meaning and is defined and measured as described further hereinbelow. If the water fluidity of the starch is less than about 10 or greater than about 63, a product giving a set or stable texture will be obtained, with no gel formation. The starch is converted to its fluidity or thin-boiling form prior to the crosslinking and drum-drying steps using a suitable method of degradation which results in the modified starch defined herein, such as mild acid hydrolysis with an acid such as e.g., sulfuric or hydrochloric acid, conversion with hydrogen peroxide, or enzyme conversion. In a preferred embodiment, the starch is acid-converted to a water fluidity of 20–40.

In the second step in the preparation of the present modified starch, the converted starch having the desired water fluidity level is reacted with any crosslinking agent capable of forming linkages between the starch molecules. Typical crosslinking agents suitable herein are those approved for use in foods such as epichlorohydrin, linear dicarboxylic acid anhydrides, acrolein, phosphorus oxychloride, and soluble metaphosphates; however, other known crosslinking agents such as formaldehyde, cyanuric chloride, diisocyanates, divinyl sulfone, and the like may also be used if the product is not to be used in foods. Preferred crosslinking agents are phosphorus oxychloride, epichlorohydrin, sodium trimetaphosphate (STMP), and adipic-acetic anhydride (1:4), and most preferably phosphorus oxychloride.

The crosslinking reaction itself is carried out according to standard procedures described in the literature for preparing crosslinked, granular starches such as that of, e.g., U.S. Pat. Nos. 2,328,537 and 2,801,242. The exact reaction conditions employed will, of course, vary with the type of crosslinking agent used, as well as the type of starch base, the reaction scale, etc. The reaction between starch and crosslinking agent may be carried out in aqueous medium, which is preferred, in which case the starch is slurried in water and adjusted to the proper pH, and the crosslinking agent added thereto.

The crosslinking reaction is generally carried out at a temperature of 5°–60° C., and preferably 20°–40° C. It will be recognized that use of temperatures above about 60° C. will be undesirable for this purpose, since granule swelling and filtration difficulties or gelatinization of the starch may result therefrom; and the starch must retain its granular form until it is drum-dried. Reaction time will vary depending mainly on the crosslinking agent and temperature used, but is typically about 0.2–2.4 hours.

After the crosslinking reaction is complete, the pH of the reaction mixture is generally adjusted to 5.5–6.5, using a common acid or base as necessary. The granular reaction product may be recovered by filtration and washed with water and dried prior to drum drying. However, such a washing step is not necessary for purposes herein, and the crosslinked product may be drum-dried directly without isolation thereof.

The amount of crosslinking agent necessary to give a product having the characteristics defined herein will vary depending, for example, on the water fluidity level of the starch, the type of drum drying employed, the type of crosslinking agent employed, the concentration of the crosslinking agent, the reaction conditions, and the necessity for having a crosslinked starch which falls within a specified range of crosslinking as determined by its viscosity characteristics. It will be recognized by the practitioner that it is not the amount of crosslinking agent which is added to the reaction vessel that determines the properties of the final product, but rather the amount of reagent which actually reacts with the starch, as measured by the Brabender viscosities. Nevertheless, the amount of phosphorus oxychloride used for reaction generally will vary from about 0.01 to 0.06% by weight, depending on the water fluidity of the starch, with the exact range also dependent on the drum drier; and other crosslinking agents may be employed in larger amounts. In all cases, however, the amount of crosslinking agent must be at least 0.005% by weight.

Since the starch can have a different degree of conversion, as measured by its water fluidity, each conversion level will yield a different viscosity with the same amount of crosslinking. Thus, the specific Brabender viscosity values required in order to produce a modified starch which forms a gel under the conditions herein prescribed are highly dependent on the degree of conversion, as measured by the water fluidity of the starch. It is therefore not possible to set Brabender parameters which will be applicable to all starches within the required 10 to 63 water fluidity range. The best correlation between Brabender viscosity and water fluidity which results in a starch having the specified minimum gel strength is made by expressing the required amount of crosslinking in terms of the parameter defined below, called the Brabender Viscosity Differential (BVD) for purposes herein:

$$\frac{V_{95} - V_{80}}{V_{80}} \times 100$$

wherein $V_{95}$ and $V_{80}$ are the Brabender viscosities of the starch at 95° and 80° C., respectively. The BVD, which is expressed in percentage units, may be a positive or negative value, depending on whether the Brabender viscosity increases or decreases, respectively, as the temperature is raised. For the water fluidity range of about 10 to 63, the Brabender Viscosity Differential of the converted, crosslinked starch may vary broadly from about −20 to +30%, measured at 7% solids using a 700 cm.-g. cartridge, or from about −35 to −4%, measured at 10% solids using a 350 cm.-g. cartridge. It will be understood by the practitioner that not all of the values within the two above-mentioned BVD ranges will be operable for starches having values within the given water fluidity range. The appropriate BVD must be determined separately for each water fluidity, and for the drum-drier to be employed, as will be described hereinbelow. It is further noted that some of the converted, crosslinked starches herein will have BVD values which lie within both of the above ranges, so that each range specified is not exclusive of the other.

In order that the gelling instant starch herein will be obtained, not only must the BVD of the converted, crosslinked starch be within a narrowly defined range, but also the Brabender viscosity of this starch as measured at 80° C. must have a certain minimum value, which depends on the solids level and cartridge used for measurement thereof. Thus, the Brabender viscosity at 80° C. must be at least 100 B.U., when measured at 7% solids using a 700 cm.-g. cartridge, and must be at least 400 B.U. when measured at 10% solids using a 350 cm.-g. cartridge. It will be recognized that these specified minima are absolute minimum values, and that they may need to be higher than that value specified above. Furthermore, some of the converted, crosslinked starches herein will have a Brabender viscosity at 80° C. which meets both requirements for the minimum viscosity. Making measurements using two different cartridges at two different percent solids levels to obtain both the BVD and minimum viscosity values was found necessary to increase sensitivity and accuracy in taking into account differences in water fluidity.

To be strictly accurate, the optimal BVD and minimum Brabender viscosity at 80° C. should be determined for each starch of a given water fluidity level and for the particular drum drier to be employed. When the laboratory single-drum drier described hereinafter and employed in most of the examples is used, a general relationship between workable water fluidity ranges and Brabender viscosity data, based on experimental results, can be expressed as follows:

| Water Fluidity Range | Brabender Viscosity Differential (BVD) Range (%) | Minimum Brabender Viscosity at 80° C. (B.V.) |
|---|---|---|
| 10-21 | −15 to +20[a] | 200[a] |
| 22-31 | −20 to +30[a] | 100[a] |
| 32-41 | −35 to −9[b] | 600[b] |
| 42-52 | −35 to −4[b] | 400[b] |
| 53-63 | −20 to −5[b] | 400[b] |

[a]Viscosity based on 700 cm.-g. cartridge at 7% solids.
[b]Viscosity based on 350 cm.-g. cartridge at 10% solids.

The above table may serve as a guideline for obtaining starches with gelling properties; however, BVD numbers slightly higher or lower than those specified may still give an acceptable gel within a particular water fluidity range. It is noted that the above guidelines were obtained based on data from the laboratory single-drum drier, and are not necessarily applicable to drum driers of a different type (e.g., having higher shear). Thus, for example, when a commercial drum drier is employed, different relationships among water fluidity, viscosity, and BVD may be observed. The practitioner is reminded that the actual numbers specified vary in a sensitive way with the crosslinking agent and drum drier used, the method of conversion to water fluidity, etc.; and that the most important criterion in defining the starch product herein is that it have the gelling properties specified hereinbelow.

The crosslinked, converted starch obtained by the steps outlined above must be pregelatinized to become cold-water dispersible. The pregelatinization is accomplished herein by using a suitable drum drier, having a signal drum or double drums, to dry the starch to a moisture level of about 12% or less. The starch slurry is typically fed onto the drum or drums through a perforated pipe or oscillating arm from a tank or vat provided with an agitator and a rotor.

The water fluidity and crosslinking levels specified above are interdependent, but they also vary to some degree with the drum drier employed. It has been found that drum driers which produce higher shear than a laboratory single-drum drier (such as a commercial single-drum drier) require that the starch have a higher level of crosslinking to obtain the present modified starch with its gelling properties. While not being limited to any one theory, it is postulated that the unique gelling properties of the products herein are related to the release of amylose during drum drying. The conversion of the starch alters the starch granule to control the size of the amylose and the amylose release; and the crosslinking, also a factor in amylose release, increases resistance of the granules to shearing breakdown on the drum drier. Thus, drum driers with higher shear possibly tend to disrupt the granules to a greater extent, liberating more amylose at a faster rate, which amylose then retrogrades on the drum. If, however, the starch is more highly crosslinked, it will resist this disruption and can be successfully drum-dried using higher-shear apparatus without an adverse effect on its gelling properties.

After drying, the starch product is removed from the drum drier in sheet form and then pulverized to a powder. Alternatively, the product may be reduced to flake form, depending on the particular end-use, although the powdered form is preferred. Any conventional equipment such as a Fitz mill or hammer mill may be used to effect suitable flaking or pulverizing.

The final product obtained from the drum-drying operation is a cold-water dispersible starch which forms a gel when dispersed in water. The determination of gel formation and the measurement of gel strength are accomplished by subjective evaluation and by Bloom Gelometer readings. These two methods of measurement are not always consistent (due in part to the cohesiveness of some of the products), but for purposes herein, the present modified starch must form a gel having a Bloom strength (as defined herein) of at least 45 grams, and preferably at least 60 grams.

In the examples which follow, all parts and percentages are given by weight and all temperatures in degrees Centigrade unless otherwise indicated.

The following analytical and testing procedures are used in the examples to characterize the starch products herein.

A. Water Fluidity Measurement

The water fluidity of converted tapioca starch is measured by using a Thomas Rotational Shear-Type Viscometer (manufactured by Arthur H. Thomas Co., Philadelphia, PA 19106), standardized at 30° C. with a standard oil having a viscosity of 24.73 cps., which oil requires 23.12±0.05 sec. for 100 revolutions. As conversion of the starch increases, the viscosity of the starch decreases. Accurate and reproducible measurements of the water fluidity are obtained by determining the time which elapses for 100 revolutions at different solids levels depending on the degree of conversion of the starch. The general procedure is as follows: The required amount of starch (e.g., 6.16 g. dry basis) is slurried in 100 ml. of distilled water in a covered copper cup, and the slurry heated in a boiling water bath for 30 min. with occasional stirring. Then, the starch solution is brought to the final weight (e.g., 107 g.) with distilled water. The time required for 100 revolutions of the resultant solution at 81°-83° C. is recorded and converted to a water fluidity number as defined in the table below:

| Amount of Starch Used (anhydrous, g.): | 6.16[a] | 8.80[b] | 11.44[c] | 13.20[d] | Water Fluidity |
|---|---|---|---|---|---|
| | Time required for 100 revolutions (sec.) | | | | |
| | 39.6 | | | | 10 |
| | 29.3 | | | | 15 |
| | 22.6 | | | | 20 |
| | 20.2 | | | | 25 |
| | | 33.4 | | | 30 |
| | | 27.4 | | | 35 |
| | | 22.5 | | | 40 |
| | | | 32.5 | | 45 |
| | | | 26.8 | | 50 |
| | | | 22.0 | | 55 |
| | | | | 24.2 | 60 |
| | | | | 19.2 | 65 |
| | | | | 15.9 | 70 |

[a]Final weight of starch solution = 107 g.
[b]Final weight of starch solution = 110 g.
[c]Final weight of starch solution = 113 g.
[d]Final weight of starch solution = 115 g.

B. Brabender Evaluation

The converted, crosslinked starch to be tested (35.4 g. anhydrous starch) is slurried in 464.6 g. distilled water and poured into the Brabender cup. The viscosity is measured using a VISCO/Amylo/GRAPH (manufactured by C. W. Brabender Instruments, Inc., Hackensack, N.J.) as follows: The starch slurry is rapidly heated to 50° C. and then heated further from 50° to 95° C. at a heating rate of 1.5° C. per minute. The viscosity readings at 80° C. and at 95° C. are recorded.

C. Gelling Evaluation

A total of 7.0 g. of starch sample (the converted, crosslinked starch after drum drying) and 20.0 g. of sugar are dry-mixed by shaking in a 4-oz. (118-ml.) jar. This dry mixture is added slowly to 100 ml. distilled water and mixed in a Sunbeam Mixmaster (trademark) Kitchen Mixer at speed #2 for a period of one minute. The resulting mixture is then poured into a 4-oz. (118-ml.) jar and placed in a refrigerator (at 15° C.) for about 16 hours. After this period, the mixture is removed from the refrigerator and allowed to stand at room temperature for 0.5 hours to give a temperature of 19±1° C. The sample is evaluated for Bloom strength using a Bloom Gelometer (Precision Scientific Co., Chicago, IL.) with a 1-in. (2.54-cm.)-diameter plunger. The gel is additionally evaluated by hand by inverting the jar and removing the sample, noting whether the form is retained. The sample is judged by degrees as being stable (fluid), a set (retains its form as lumps, but when stirred, becomes fluid), weak gel (retains some form and is able to be cut, but is only a soft gel), medium gel (retains more of its form), or strong gel (retains complete form and cuts cleanly). The relationship between Bloom strength and hand evaluation is not always consistent, but in general a relationship can be made as follows:

| Bloom Strength (g.) | Description of Gel |
| --- | --- |
| 100 or more | very strong gel |
| 90–100 | strong gel |
| 80–90 | medium to strong gel |
| 70–80 | medium gel |
| 60–70 | weak gel or set |
| 45–60 | set, very weak gel |

It is to be noted that in some cases the Bloom strength of a weak or very weak gel cannot be measured. Hence, to evaluate a gel accurately one should take into account both the Bloom strength and the visual description thereof.

EXAMPLE I

This example illustrates the procedure for conversion of starch to a required water fluidity level.

A total of 2000 g. of tapioca starch was stirred into 2500 ml. of distilled water and heated in a water bath to 45° C. Then, 6.0 g. of concentrated hydrochloric acid (36.5–38%) was added and the mixture stirred at 45° C. for 16 hours. The hydrolysis was stopped by neutralizing the mixture with 3% sodium hydroxide solution to a pH of 5.5–6.5. The slurry was then filtered, washed, and dried. The water fluidity of the thus-recovered starch, designated hereinbelow as Starch Sample No. 1, was found to be 10.0, as measured by the test procedure above described.

EXAMPLE II

This example illustrates the preparation of several converted starches having a range of water fluidities of from 15.2 to 68.0.

Starch Sample Nos. 2–13 designated in Table I were prepared using the procedure of Example I, varying the amounts of starch, water and acid, and the type of acid employed. Starch Sample Nos. 2,3 and 5 were reacted at 45° C. for 16, 18 and 17.5 hours, respectively, while Starch Sample Nos. 4 and 6–13 were reacted at 52° C. for 16 hours. The water fluidity (W.F.) of each starch obtained was determined as in Example I, and the results given in Table I. It is noted that a given degree of conversion can be obtained in shorter reaction times than those used herein when higher concentrations of acid and/or higher temperatures below the gelatinization temperature are employed.

TABLE I

| Starch Sample No. | W.F. | Amount of Starch (g.) | Amount of Water (g.) | Type of Acid | Amount of Acid (g.) |
| --- | --- | --- | --- | --- | --- |
| 2 | 15.2 | 2000 | 2500 | $H_2SO_4$ | 4.0 |
| 3 | 22.0 | 3000 | 3750 | HCl | 12.0 |
| 4 | 25.0 | 2500 | 3750 | $H_2SO_4$ | 6.25 |
| 5 | 26.7 | 3000 | 3750 | HCl | 15.0 |
| 6 | 37.0 | 2000 | 3000 | $H_2SO_4$ | 8.0 |
| 7 | 47.8 | 2000 | 3000 | $H_2SO_4$ | 14.0 |
| 8 | 51.2 | 5000 | 3750 | $H_2SO_4$ | 35.0 |
| 9 | 56.2 | 2000 | 3000 | $H_2SO_4$ | 20.0 |
| 10 | 60.5 | 2000 | 3000 | $H_2SO_4$ | 25.0 |
| 11 | 63.0 | 2000 | 3000 | $H_2SO_4$ | 30.0 |
| 12 | 65.8 | 2000 | 3000 | $H_2SO_4$ | 36.0 |
| 13 | 68.0 | 2000 | 3000 | $H_2SO_4$ | 42.0 |

EXAMPLE III

This example illustrates crosslinking and drum drying of converted tapioca starch to obtain the gelling instant starch herein.

The starches designated as Sample Nos. 14–59 in Table II were prepared as follows:

A total of 400 g. of one of Starch Sample Nos. 1–13 was slurried in 500 ml. water containing 2 g. sodium chloride and 2.4 g. sodium hydroxide. Thereafter, with good agitation, reagent-grade phosphorus oxychloride ($POCl_3$, b.p. 105°–108° C., d=1.675) was added in the amount given (12 l.=0.005% by weight on starch having normal moisture content; 48 l.=0.02%, etc.); and the mixture was allowed to react at a temperature of about 20.5° C. to 30° C. for two hours. After reaction was complete, the mixture was neutralized with dilute hydrochloric acid (1 part 36.5–38% HCl to 3 parts water) to pH 5.5–6.5, filtered, washed, and dried.

Each starch sample indicated in Table II (either acid-converted or acid-converted and crosslinked) was evaluated for Brabender viscosity wherever possible by the above-described test procedure. Then, each sample was drum-dried by slurrying 200 g. starch 300 ml. water and drying the slurry on a steam-heated steel drum, with steam pressure of 105–110 psi. (7.38–7.73 kg./cm.$^2$), having the following specifications:

| | Speed (RPM) | Length in. (cm.) | Temperature °F. (°C.) | Diameter in. (cm.) |
| --- | --- | --- | --- | --- |
| Feed Roller | 52.86 | 10 (25.4) | — | 2 (5.1) |
| Drum | 5.08 | 10 (25.4) | 287–293 (142–145) | 10 (25.4) |

The pregelatinized starch sheets thus obtained were then pulverized using a laboratory pulverizing mill (#008 screen), manufactured by Weber Brother Metal Works, Chicago, IL.

The dried starch products were evaluated as to their gelling properties by the Bloom strength and hand-evaluation tests above described. The results are given in Table II. It can be seen that no gels are obtained when the water fluidity (W.F.) is greater than about 63, or when the starch is not crosslinked, or is outside the specified BVD and minimum Brabender viscosities at 80° C. The interdependent relationship of the water fluidity of the starch to its BVD and viscosity at 80° C. is evident from the data. Some inconsistencies in the hand and Bloom gel strength tests occur, but, in general, as the Bloom strength value increases, a stronger gel is observed.

EXAMPLE IV

This example illustrates the use of different crosslinking agents to prepare the modified starch herein.

A. Sodium Trimetaphosphate (STMP): (Sample Nos. 60–61)

A total of 200 g. of Starch Sample No. 3 (W.F. 22.0) was slurried in 250 ml. water containing 1.0 g. sodium

TABLE II

| Starch Sample No. | W.F. of Starch Base | Amount of POCl$_3$ (% on starch as is) | Brabender Viscosity (B.U.) 80° C. | Brabender Viscosity (B.U.) 95° C. | Cartridge No./Percent Solids | BVD (%) | Gel Evaluations Bloom Strength (g.) | Gel Evaluations Hand Evaluation |
|---|---|---|---|---|---|---|---|---|
| 1[a] | 10.0 | — | — | — | — | — | —[b] | stable |
| 14[a] | " | 0.005 | 1655 | 1350 | 350/7[c] | −18.4 | 47.4, 31.6 | weak gel (very cohesive) |
| 15 | " | 0.010 | 1575 | 1540 | 350/7 | −2.2 | 77.3 | medium to strong gel |
| 16 | " | 0.015 | 460 | 535 | 350/7 | +16.3 | 69.7 | medium gel |
| 17[a] | " | 0.020 | 410 | 550 | 350/7 | +34.1 | 54.4, 55.5 | stable |
| 2[a] | 15.2 | — | 620 | 240 | 350/7 | −61.3 | —[b] | stable |
| 18[a] | " | 0.005 | 640 | 490 | 350/7 | −23.4 | 61.4 | set (cohesive) |
| 19[a] | " | 0.0075 | 700 | 570 | 350/7 | −18.5 | 67.9 | set (cohesive) |
| 20 | " | 0.010 | 725 | 630 | 350/7 | −13.1 | 77.3 | medium gel |
| 3[a] | 22.0 | — | 400 | 150 | 350/7 | −62.5 | —[b] | stable |
| 21 | " | 0.010 | 590 | 510 | 700/7 | −13.6 | 104.5 | very strong gel |
| 22 | " | 0.015 | 280 | 315 | 700/7 | +12.5 | 107.4 | strong gel |
| 23 | " | 0.018 | 210 | 255 | 700/7 | +21.4 | 75.9 | medium to strong gel |
| 24 | " | 0.020 | 190 | 230 | 700/7 | +21.1 | 69.0 | set to weak gel |
| 5[a] | 26.7 | — | 330 | 130 | 350/7 | −60.6 | —[b] | stable |
| 25 | " | 0.010 | 340 | 345 | 700/7 | +1.5 | 120.3 | very strong gel |
| 26 | " | 0.015 | 225 | 250 | 700/7 | +11.1 | 102.4 | strong gel |
| 27 | " | 0.020 | 150 | 190 | 700/7 | +26.7 | 85.4 | medium to strong gel |
| 28[a] | " | 0.025 | 65 | 80 | 700/7 | +23.1 | 60.2 | set |
| 6[a] | 37.0 | — | 350 | 150 | 350/10 | −51.1 | —[b] | stable |
| 29[a] | " | 0.005 | — | — | — | — | 22.1 | stable |
| 30 | " | 0.010 | 605 | 425 | 700/10[d] | −30.0 | 59.6 | weak to medium gel |
| 31 | " | 0.020 | 840 | 680 | 700/10 | −19.0 | 78.5 | medium to strong gel |
| 32 | " | 0.025 | 1000 | 850 | 700/10 | −15.0 | 110.4 | strong gel |
| 33 | " | 0.030 | 1040 | 940 | 700/10 | −9.6 | 99.9 | strong gel |
| 34[a] | " | 0.035 | 1040 | 995 | 700/10 | −4.3 | 72.5, 60.3 | stable |
| 7[a] | 47.8 | — | 110 | 50 | 350/10 | −54.5 | —[b] | stable |
| 35[a] | " | 0.005 | 270 | 155 | 350/10 | −42.6 | —[b] | weak gel |
| 36 | " | 0.010 | 430 | 290 | 350/10 | −32.6 | 54.3 | medium gel |
| 37 | " | 0.020 | 770 | 560 | 350/10 | −27.3 | 80.2 | very strong gel |
| 38 | " | 0.025 | 1000 | 810 | 350/10 | −19.0 | 89.0 | very strong gel |
| 8[a] | 51.2 | — | 120 | 50 | 350/10 | −58.3 | —[b] | stable |
| 39 | " | 0.025 | 995 | 850 | 350/10 | −24.3 | 99.0 | strong gel |
| 40 | " | 0.030 | 1050 | 950 | 350/10 | −9.5 | 90.2 | medium to strong gel |
| 41 | " | 0.035 | 1115 | 1060 | 350/10 | −4.9 | 87.6 | medium gel |
| 9[a] | 56.2 | — | 65 | 30 | 350/10 | −53.9 | —[b] | stable |
| 42 | " | 0.010 | 540 | 445 | 350/10 | −17.6 | 69.3 | medium to strong gel |
| 43 | " | 0.020 | 675 | 565 | 350/10 | −16.3 | 83.2 | strong gel |
| 44 | " | 0.030 | 810 | 740 | 350/10 | −8.2 | 70.9 | strong gel |
| 45 | " | 0.035 | 960 | 910 | 350/10 | −5.2 | 66.0 | weak gel |
| 10[a] | 60.5 | — | too thin | too thin | — | — | —[b] | stable |
| 46[a] | " | 0.005 | — | — | — | — | —[b] | stable |
| 47[a] | " | 0.010 | 150 | 95 | 350/10 | +36.7 | —[b] | stable |
| 48[a] | " | 0.020 | 255 | 190 | 350/10 | +25.3 | —[b] | very weak gel |
| 49 | " | 0.030 | 560 | 470 | 350/10 | −16.1 | 62.5, 61.5 | medium to strong gel |
| 11[a] | 63.0 | — | too thin | too thin | — | — | —[b] | watery |
| 50[a] | " | 0.020 | " | " | — | — | —[b] | watery |
| 51 | " | 0.030 | 380 | 310 | 350/10 | −18.4 | 48.3 | weak gel |
| 52 | " | 0.045 | 490 | 420 | 350/10 | −14.3 | 60.7 | weak to medium gel |
| 53[a] | " | 0.050 | 550 | 530 | 350/10 | −3.6 | —[b] | set |
| 54[a] | " | 0.055 | 610 | 600 | 350/10 | −1.6 | —[b] | stable |
| 12[a] | 65.8 | — | too thin | too thin | — | — | —[b] | — |
| 55[a] | " | 0.045 | " | " | — | — | —[b] | stable |
| 56[a] | " | 0.060 | " | " | — | — | —[b] | stable |
| 13[a] | 68.0 | — | " | " | — | — | —[b] | — |
| 57[a] | " | 0.005 | " | " | — | — | —[b] | two phases |
| 58[a] | " | 0.020 | " | " | — | — | —[b] | two phases |
| 59[a] | " | 0.045 | " | " | — | — | —[b] | stable |

[a]These examples are outside the scope of the invention and are included only for comparative purposes.
[b]Bloom strength is not measurable.
[c]A 350 cm.-g. cartridge at 7% solids yields a Brabender viscosity twice that of a 700 cm.-g. cartridge at 7% solids.
[d]A 700 cm.-g. cartridge at 10% solids yields a Brabender viscosity half that of a 350 cm.-g. cartridge at 10% solids.

chloride and 1.2 g. sodium hydroxide. STMP was then added in the amount indicated in Table III. After stirring for 15.5 hours at room temperature, the mixture was neutralized with dilute hydrochloric acid (prepared by mixing one part of 10% HCl with three parts of water) to pH 5.5–6.5, filtered, washed, and air-dried.

B. Epichlorohydrin: (Sample Nos. 62–63)

A total of 200 g. of Starch Sample No. 3 was slurried in 250 ml. water containing 1.0 g. sodium hydroxide. The epichlorohydrin was added in the amount given in Table III as a 1% aqueous solution and allowed to react on the roller. After 17 hours, the mixture was neutralized and the starch isolated as described above.

C. Adipic-Acetic Mixed Anhydride: (Sample Nos. 64–66)

A total of 400 g. of Starch Sample No. 4 (W.F. 25.0) was slurried in 500 ml. water and the pH was adjusted to 8 with 3% sodium hydroxide solution. Then, mixed anhydride (prepared by gradually heating a mixture of one part adipic acid and four parts acetic anhydride to 90° C. over a period of one hour and holding at 90° C. for one hour) was added slowly in the amounts indicated in Table III, with the pH controlled at 8 with 3% sodium hydroxide solution. After completion of addition, the mixture was allowed to stir for an additional 15 minutes, and was then neutralized and isolated as described above.

Each of the crosslinked products prepared as above was evaluated for Brabender viscosity, then drum-dried, and measured for gel properties as previously described. The results are given in Table III. It can be seen from the data that crosslinking agents other than phosphorus oxychloride may be used to obtain gels within the limits prescribed herein.

EXAMPLE V (comparative)

This example illustrates that using waxy maize or corn starch does not result in the gelling instant starch defined herein.

A total of 300 g. waxy maize or corn starch which had been hydrolyzed with hydrochloric acid at 50° C. for 16.5 hours to the indicated water fluidity was slurried in 375 ml. water containing 1.5 g. sodium chloride and 1.8 g. sodium hydroxide. Then, with good agitation, the indicated amount of reagent-grade phosphorus oxychloride was added and the mixture allowed to react at room temperature for two hours. After reaction was complete, the mixture was neutralized with dilute hydrochloric acid to pH 5.5–6.5, filtered, washed and dried. The Brabender viscosities for waxy maize starch of W.F. 21 and corn starch of W.F. 27 were measured. Each starch was then drum-dried, using the equipment previously described, and evaluated for gel strength. The results are summarized in Table IV.

The Brabender viscosity of the waxy maize starch was found to be in the claimed range, while the Brabender viscosity of the corn starch was not, because crosslinked corn starch has a gelatinization temperature greater than 80° C. However, comparable amounts of phosphorus oxychloride were added in all cases, and it can thus be concluded that waxy maize and corn starch do not give a gel under comparable conditions.

EXAMPLE VI (comparative)

This example illustrates that starches which are crosslinked to within the claimed Brabender range and drum-dried without being converted to a certain water fluidity level do not have the gel characteristics defined herein.

TABLE III

| Starch Sample No. | Amount of STMP (% by weight on starch as is) | Amount of Epichlorohydrin (% by weight on starch as is) | Amount of Adipic-Acetic Anhydride (% by weight on starch as is) | Brabender Viscosity (B.U.)[a] 80° C. | Brabender Viscosity (B.U.)[a] 95° C. | BVD (%) | Gel Evaluations Bloom Strength (g.) | Gel Evaluations Hand Evaluation |
|---|---|---|---|---|---|---|---|---|
| 60 | 0.050 | — | — | 950 | 760 | −20.0 | 58.9 | weak gel |
| 61 | 0.150 | — | — | 760 | 700 | −7.9 | 93.6 | strong gel |
| 62 | — | 0.020 | — | 1265 | 1260 | −0.4 | 100.8 | strong gel |
| 63 | — | 0.030 | — | 700 | 830 | +19.0 | 64.0 | set |
| 64 | — | — | 0.225 | 1020 | 910 | −10.8 | 95.1 | strong gel |
| 65 | — | — | 0.275 | 1000 | 950 | −5.0 | 98.2 | very strong gel |
| 66 | — | — | 0.300 | 535[b] | 455[b] | −15.0 | 86.7 | strong gel |

[a]Measured using a 350 cm.-g. cartridge at 7% solids.
[b]Measured using a 700 cm.-g. cartridge at 7% solids.

TABLE IV

| Type of Starch | W.F. of Starch Base | Amount of POCl$_3$ (% by weight on starch as is) | (l.) | Brabender Viscosity (B.U.)[a] 80° C. | Brabender Viscosity (B.U.)[a] 95° C. | BVD (%) | Gel Evaluation[b] Hand Evaluation |
|---|---|---|---|---|---|---|---|
| Waxy Maize | 9 | 0.02 | 36 | — | — | — | stable |
| " | 9 | 0.03 | 54 | — | — | — | " |
| " | 21 | 0.01 | 18 | 890 | 790 | −11.2 | " |
| " | 21 | 0.02 | 36 | — | — | — | " |
| " | 50 | 0.01 | 18 | — | — | — | " |
| Corn | 11 | 0.01 | 18 | — | — | — | two phases |
| " | 11 | 0.02 | 36 | — | — | — | " |
| " | 17 | 0.01 | 18 | — | — | — | " |
| " | 17 | 0.02 | 36 | — | — | — | " |
| " | 27 | 0.01 | 18 | 22 | 510 | >+100[c] | " |

TABLE IV-continued

| Type of Starch | W.F. of Starch Base | Amount of POCl₃ (% by weight on starch as is) | (l.) | Brabender Viscosity (B.U.)[a] 80° C. | 95° C. | BVD (%) | Gel Evaluation[b] Hand Evaluation |
|---|---|---|---|---|---|---|---|
| " | 27 | 0.02 | 36 | — | — | — | " |

[a]Measured using a 700 cm.-g. cartridge at 7% solids.
[b]Bloom strengths of the products could not be measured because all products were either stable or consisted of two phases.
[c]Crosslinked corn starch has a higher gelatinization temperature than 80° C., so Brabender measurements cannot be made under conditions comparable to those for waxy maize or tapioca starch.

A total of 800 g. raw tapioca starch was slurried in 100 ml. distilled water containing 4 g. of sodium chloride and 4.8 g. of sodium hydroxide. To this slurry was added the indicated amount of phosphorus oxychloride, and the resulting slurry was stirred at 25° C. for two hours. The mixture was then neutralized with dilute hydrochloric acid to pH 5.5–6.5, filtered, and air-dried. Brabender viscosity data was obtained for each starch. These products were then drum-dried and evaluated for gel strength as described above. The results are indicated in Table IV.

TABLE V

| Amount of POCl₃ (% by weight) | Brabender Viscosity (B.U.)* 80° C. | 95° C. | BVD (%) | Gel Evaluations Bloom Strength (g.) | Hand Evaluation |
|---|---|---|---|---|---|
| 0.006 | 730 | 890 | +21.9 | 76.1 | stable, smooth |
| 0.008 | 535 | 700 | +30.8 | 65.7 | " |
| 0.010 | 310 | 435 | +40.3 | 51.4 | " |

*Measured using a 700 cm.-g. cartridge at 7% solids.

The Bloom strengths herein are measurable even though the gels are stable because the viscosity of raw (unconverted) starch is greater than that of fluidity starch.

The results show that when the tapioca starch is crosslinked but not converted to a fluidity starch, the resulting product will not have gelling properties.

EXAMPLE VII

This example illustrates the effect of pH and of sugar on the gel strength of the present modified starch.

A. Effect of pH

Starch Sample No. 4 (W.F. 25.0) was crosslinked as described for the preparation of Samples Nos. 14–59 (using 1000 g. starch, 1250 g. water, 5.0 g. sodium chloride, and 6 g. sodium hydroxide) with 0.01%, by weight of the starch as is (60 l.), of phosphorus oxychloride, washed with water, drum-dried, and evaluated for gel strength. The pH of the starch dispersion used for gel evaluation was adjusted to the value indicated in Table VI.

TABLE VI

| pH of Starch Dispersion | Gel Evaluations Bloom Strength (g.) | Hand Evaluation |
|---|---|---|
| 1.3 | 92.6 | strong gel |
| 1.8 | 96.7 | " |
| 5.8 | 103.6 | " |
| 8.5 | 99.1 | " |
| 8.9 | 86.2 | medium to strong gel |

The results indicate that the strength of the gel reaches a maximum near neutral pH and decreases slightly in more acidic or basic media. Thus, gel formation is not expected to be altered significantly by the pH's encountered in food systems (usually between about 3 and 9).

B. Effect of sugar

The starch used in Part A and Starch Sample No. 51 (W.F. 63.0) were used to prepare different dispersions containing varying amounts of starch and sugar, employing the gelling test procedure described previously. Each sample was tested for gel formation, and the results are summarized in Table VII.

TABLE VII

| Amount of Sugar (g.) | W.F. of Starch Base | Amount of Starch (g.) | Gel Evaluations Bloom Strength (g.) | Hand Evaluation |
|---|---|---|---|---|
| 20 | 25.0 | 5 | 42.0 | stable |
| 20 | " | 6 | 66.9 | weak gel |
| 20 | " | 7 | 95.6 | strong gel |
| 15 | " | 7 | 92.9 | strong gel |
| 10 | " | 7 | 96.8 | strong gel |
| 5 | " | 7 | 89.0 | medium gel |
| 0 | " | 7 | 74.4 | medium gel |
| 0 | 63.0 | 7 | 44.9 | stable to set |
| 0 | " | 8 | 66.1 | set |
| 0 | " | 10 | 180.1 | medium gel |
| 0 | " | 12 | 295.5 | strong gel |

Sugar is added to prevent lumping and thereby help disperse the drum-dried product in water. The results show that whether sugar is present or not, the gel strength is increased by raising starch solids. Thus, gel formation can be obtained without adding sugar to any of the starches herein if the starch solids are adjusted accordingly. Also, the amounts of sugar required to aid gel formation vary with the water fluidity of the starch.

EXAMPLE VIII

This example illustrates the effect of different drum driers on gel formation of the starch herein.

On a commercial scale, Starch Sample A in Table VIII was prepared as follows: A total of 1500 lbs. (680 kg.) of raw tapioca starch was acid-converted to a water fluidity of 23 and crosslinked with 0.015% phosphorus oxychloride at a temperature of 82° F. (28° C.). After the crosslinking reaction was complete, the mixture was neutralized with dilute hydrochloric acid, filtered, washed and dried. The Brabender viscosity of the sample was measured and found to be 400 B.U. at 80° C. and 370 B.U. at 95° C., measured using a 700 cm.-g. cartridge at 7% solids, to give a BVD of −7.5%.

Starch Sample B in Table VIII was prepared in an identical manner as above except that the starch had a water fluidity of 28 and was crosslinked using 0.028% phosphorus oxychloride. The Brabender viscosity of this sample was 325 B.U. at 80° C. and 330 B.U. at 95° C., measured using a 700 cm.-g. cartridge at 7% solids, to give a BVD of +1.5%.

Starch Sample C in Table VIII was prepared in an identical manner as Starch Sample B except that the starch had a water fluidity of 32 and was crosslinked using 0.053% phosphorus oxychloride. The Brabender viscosity of the sample was 170 B.U. at 80° C. and 200 B.U. at 95° C., measured using a 700 cm.-g. cartridge at 7% solids, to give a BVD of +17.6%.

Each of Starch Samples A and B was divided into three portions: the first portion was dried on a laboratory single-drum drier as previously described; the second portion was dried on a laboratory double-drum drier; and the third portion was dried on a commercial single-drum drier, the latter two driers being described in Table VIII. Starch Sample C was dried only on the commercial drier. Each starch was evaluated for gel strength, and the results are indicated in Table VIII.

TABLE VIII

| Starch Sample | Type of Drum Drier[b] | Gel Evaluations | |
|---|---|---|---|
| | | Bloom Strength (g.) | Hand Evaluation |
| A | Lab Single Drum | 84.6 | medium to strong gel |
| A | Lab Double Drum | 78.4 | medium gel |
| A[a] | Commercial Single Drum | 46.0 | set |
| B | Lab Single Drum | 105.0 | medium to strong gel |
| B | Lab Double Drum | 88.4 | medium to strong gel |
| B | Commercial Single Drum | 75.5 | weak to medium gel |
| C | Commercial Single Drum | 80.0 | weak to medium gel |

[a]This example is included for comparative purposes.
[b]Description of Drum Driers:

| Type of Drum Drier | Speed (RPM) | Length ft. (cm.) | Temperature °F. (°C.) | Diameter ft. (cm.) | Steam Pressure psi (kg./cm.²) |
|---|---|---|---|---|---|
| Lab Single Drum | as described before | | | | |
| Lab Double Drum | 5 | 1.5 (45.7) | 295–310 (146–154) | 1 (30.5) | 95 (6.68) |
| Commercial Single Drum: | | | | | |
| Feed Roller | 33 | 2.5 (76.2) | — | 1 (30.5) | — |
| Drum | 5.25 | 2.5 (76.2) | 330–335 (166–168) | 5 (152.5) | 105 (7.38) |

The results indicate that the level of crosslinking required for a given fluidity tapioca starch to yield a gel-forming product is dependent on the type of drum drier employed. In general, as the shear of the drum drier increases, the amount of crosslinking necessary for the product to form a gel increases.

EXAMPLE IX

This example illustrates the preparation of a lemon pie filling containing the present gelling instant starch.

The following ingredients were employed in the indicated amounts:

| | |
|---|---|
| Starch Sample No. 21 | 6.000% |
| Lemon Crystals #7 | 0.700% |
| Water | 64.445% |
| Sugar | 26.000% |
| Liquid Non-Dairy Creamer | 2.000% |
| Egg Yolk Solids | 0.700% |
| Adipic Acid | 0.150% |
| F.D.&C. Yellow #5 | 0.005% |
| | 100.000% |

All dry ingredients were first blended thoroughly. The water and non-dairy creamer were placed in the mixing bowl of a Mixmaster mixer, and the dry mix was added to the liquid while mixing at a low speed (#2) until smooth. The filling thus obtained was placed in a baked pie crust and refrigerated for a minimum of four hours. The resulting pie filling had a short, tender gel which cut easily. The flavor as well as the texture and mouth-feel of the filling was good.

When two lemon pie fillings were prepared in the same manner except that Starch Sample No. 21 was replaced by Starch Samples B and C, respectively, of Example VIII, comparable results were obtained.

EXAMPLE X

This example illustrates the preparation of an instant imitation grape jelly employing the starch herein.

The following ingredients were employed in the following amounts:

| | |
|---|---|
| Starch Sample No. 21 | 5.95% |
| Sugar | 29.00% |
| Sodium Benzoate | 0.09% |
| Unsweetened Concord Grape Juice | 45.00% |
| Water | 19.96% |
| | 100.00% |

The solid ingredients were blended together and added to the liquids in the mixing bowl of a Sunbeam Mixmaster mixer and mixed on low speed for 2–3 minutes. The resulting mixture was refrigerated for a minimum of 4 hours.

The resultant jelly had a cleanly cutting jelly texture, which was notable because large amounts of sugar (65%) are usually added to the jelly to obtain these properties, as would be necessary if pectin, the typical gelling agent for jellies, were employed.

EXAMPLE XI

This example illustrates the preparation of an instant vanilla Bavarian cream employing the starch herein.

The following ingredients were employed in the given amounts:

| | |
|---|---|
| Starch Sample No. 33 | 25.300% |
| Capsul-Lok (trademark) Artificial Vanilla Flavor | 0.040% |
| Sugar, Bakers Special Grind | 69.400% |
| Spray-dried Vegetable Oil Base | 4.100% |
| Salt | 0.842% |
| Titanium Dioxide | 0.300% |
| Color: Atlene Medium Yellow Egg Shade #640 (from H. Kohnstamm) | 0.008% |
| | 100.000% |

All ingredients were dry-blended thoroughly. Then 103.65 g. of this dry mix was added to 300 ml. of cold water in the mixing bowl of a Mixmaster Mixer and mixed at medium speed (#4) for 2–3 minutes. The resulting cream was refrigerated for a minimum of four hours.

The resultant cream had a short tender gel which cut cleanly and had a desirable flavor and texture.

Summarizing, the present invention is seen to provide a modified starch having unique gelling properties when dispersed in cold water, prepared by drum-drying a converted, crosslinked tapioca starch under certain specified conditions.

Now that the preferred embodiments herein have been described in detail, various modifications and improvements thereon will become readily apparent to those skilled in the art. Accordingly, the present spirit and scope are to be limited only by the appended claims, and not by the foregoing specification.

What is claimed is:

1. A cold-water dispersible, modified tapioca starch with gelling properties, prepared by drum-drying a tapioca starch which has been converted to a water fluidity of about 10 to about 63 and thereafter reacted with at least 0.005% by weight of a crosslinking agent, said converted, crosslinked starch being further defined as having a Brabender Viscosity Differential, measured between 80 and 95° C., of from about −20 to +30%, measured at 7% solids using a 700 cm.-g. cartridge, or of from about −35 to −4%, measured at 10 % solids using a 350 cm.-g. cartridge, and as having a Brabender viscosity at 80° C. of at least about 100 B.U., measured at 7% solids using a 700 cm.-g. cartridge, or of at least about 400 B.U., measured at 10% solids using a 350 cm.-g. cartridge, said converted, crosslinked starch after drum-drying being capable of forming a gel having a Bloom strength of at least 45 grams.

2. The modified starch of claim 1 wherein said starch is acid-converted to a water fluidity of 20–40.

3. The modified starch of claim 1 wherein said crosslinking agent is selected from the group consisting of phosphorus oxychloride, epichlorohydrin, sodium trimetaphosphate, and adipic-acetic anhydride.

4. A process for preparing a cold-water dispersible, modified tapioca starch with gelling properties comprising the steps of:
   a. converting a tapioca starch to a water fluidity of about 10 to about 63;
   b. reacting said starch with at least 0.005% by weight of a crosslinking agent such that the converted, crosslinked starch has a Brabender Viscosity Differential, measured between 80 and 95° C., of from about −20 to +30%, measured at 7% solids using a 700 cm.-g. cartridge, or of from about −35 to −4%, measured at 10% solids using a 350 cm.-g. cartridge, and has a Brabender viscosity at 80° C. of at least about 100 B.U., measured at 7% solids using a 700 cm.-g. cartridge, or of at least about 400 B.U., measured at 10% solids using a 350 cm.-g. cartridge; and
   c. drum-drying the converted, crosslinked starch to obtain said modified starch, said modified starch being defined as capable of forming a gel having a Bloom strength of at least 45 grams.

5. A food system containing the cold-water dispersible, modified tapioca starch of claim 1.

* * * * *